United States Patent [19]
Zoppi

[11] 3,823,561
[45] July 16, 1974

[54] HYDRAULIC DRIVING UNIT FOR WINDSHIELD WIPERS IN MOTOR VEHICLES

[75] Inventor: Bruno Zoppi, Milan, Italy

[73] Assignee: Fabbrica Italiana Magneti Marelli S.p.A., Milan, Italy

[22] Filed: May 9, 1972

[21] Appl. No.: 251,769

[30] Foreign Application Priority Data
May 11, 1971 Italy .................................. 24342/71

[52] U.S. Cl..................... 60/592, 60/374, 60/455, 91/401
[51] Int. Cl............................................. F15b 7/00
[58] Field of Search......... 60/54.5 R, 374, 455, 476, 60/97 P, 571, 572, 573, 592; 91/170, 171, 401

[56] References Cited
UNITED STATES PATENTS

| | | | |
|---|---|---|---|
| 670,447 | 3/1901 | Fulton...................... | 60/54.5 R UX |
| 1,904,345 | 4/1933 | Anthony et al................... | 91/401 X |
| 2,334,383 | 11/1943 | Carr et al............................ | 60/573 |
| 2,657,536 | 11/1953 | Levy ..................................... | 60/54.5 R |
| 3,070,959 | 1/1963 | Giampapa et al................ | 60/54.5 R |
| 3,286,640 | 11/1966 | Bauer............................. | 60/54.5 R X |
| 3,579,989 | 5/1971 | Stark et al....................... | 60/54.5 R |

FOREIGN PATENTS OR APPLICATIONS

| | | | |
|---|---|---|---|
| 517,314 | 1/1940 | Great Britain....................... | 60/97 P |
| 500,673 | 2/1939 | Great Britain........................ | 60/571 |

*Primary Examiner*—Edgar W. Geoghegan
*Attorney, Agent, or Firm*—Waters, Roditi, Schwartz & Nissen

[57] ABSTRACT

A hydraulic driving unit for windshield wipers comprising a transmitter having a double-acting piston with chambers at opposite ends thereof adapted to convey to corresponding chambers of two series connected motors, quantities of liquid which are greater than the quantities of liquid in the corresponding chambers of the motors. Each motor is connected by a rack and pinion device to a respective windshield wiper. The pistons in the motors are provided with passageways connecting the opposite end chambers and valves are contained in the passageways for being respectively opened to control the flow of excess liquid from one chamber to the other when the pistons have reached their end of stroke positions. An auxiliary pump is connected to the transmitter for circulation of a leakage liquid from the transmitter or from the motors back to the chambers of the transmitter.

9 Claims, 1 Drawing Figure

PATENTED JUL 16 1974
3,823,561
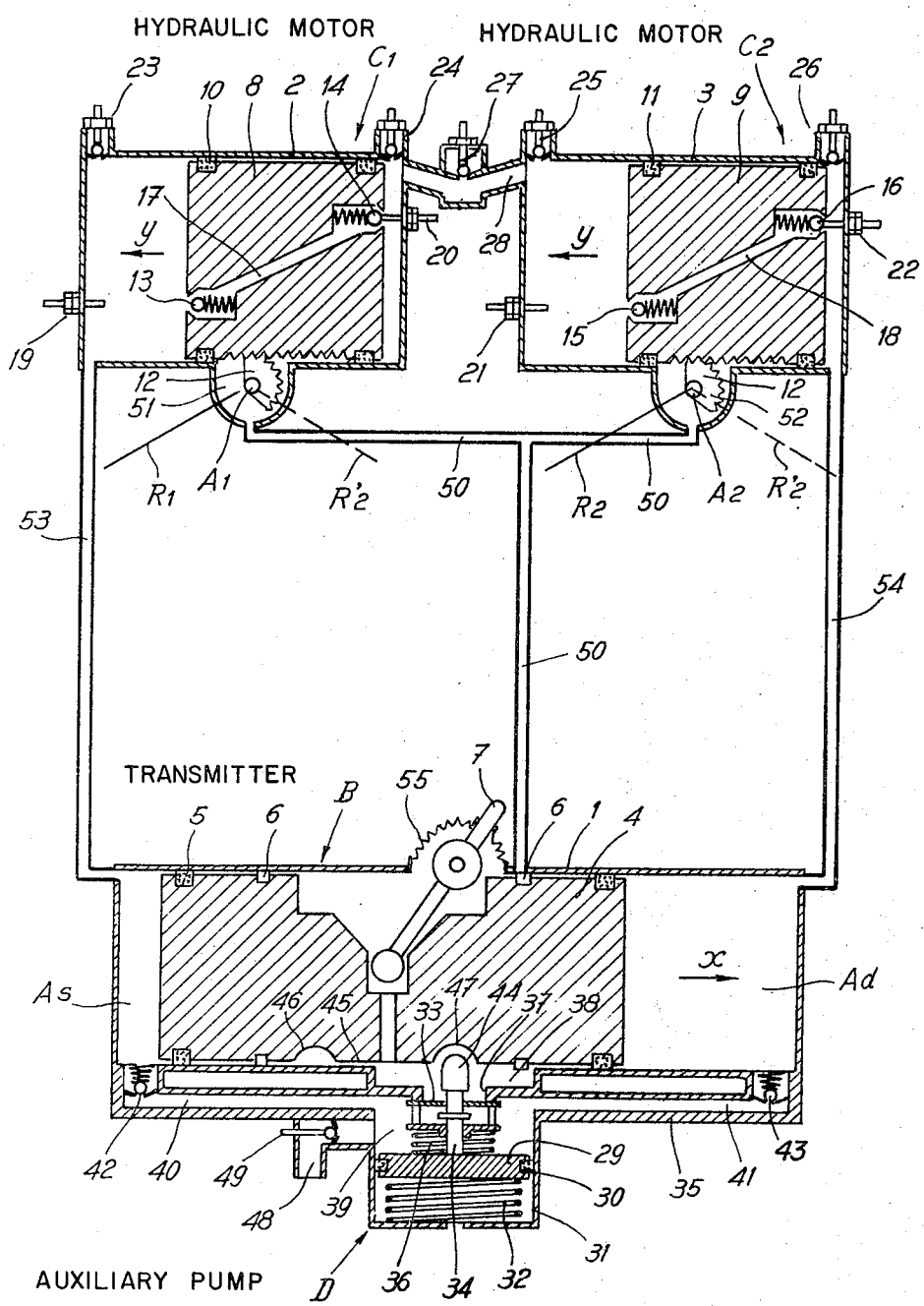

HYDRAULIC DRIVING UNIT FOR WINDSHIELD WIPERS IN MOTOR VEHICLES

The present invention refers to improvements in hydraulic driving units for windshield wipers, consisting of an alternate double-action piston transmitter, driven by a motor of any convenient type and of one or more double-action piston motors connected in series which follow the alternate motion of the transmitter through the pressurized liquid which is conveyed to said motor or motors by said transmitter.

The alternate translatory motion of the piston of each of the motors is then changed into an alternate rotary motion, by means of a rack and pinion coupling, wherein the rack is integral with the piston and the pinion keyed on a shaft, to which an end of the windshield wiper arm is fixed to realize an alternate and absolutely synchronous rotatory motion of the windshield wiper, without the need to resort to complex connecting mechanisms for the wiper arms, as the transmission of the motion is obtained by means of hydraulic circuits.

However, in hydraulic windshield wipers of the above mentioned type, the problems connected with oil leakage in the hydraulic circuits and with noise due to the impact of the windshield wipers at the end of the stroke are well-known problems. Oil leakages can occur through the sealing gaskets of the pistons of the transmitter and of the motors, as well as through the couplings of the connecting ducts. Well-known drawbacks are the difficulties encountered in preventing oil leakage through the slidable seal of a piston, except in such cases, when use is made of very elaborate and hence expensive seals with very small sliding surfaces.

It will be sufficient to consider the liquid film which remains, at each translatory motion of the piston, on the cylindrical sliding surface of the cylinder, notwithstanding the successive translatory motion in opposite direction, which causes the progressive accumulation of liquid in the central chamber which communicates with the atmosphere and is confined both between the gaskets of the transmitter and of the motors. The liquid which leaks through the hydraulic gaskets of the pistons of the transmitter and of the motors and which accumulates in the central chambers of the pistons of the transmitter and of the motors, must be discharged to the outside and therefore is lost. Moreover, in addition to the problem of draining said liquid without causing deterioration or soiling, there are further maintainance costs to be borne for the filling of the circuit at regular intervals and it is a serious drawback when it is necessary to refill during the normal performance of the unit.

Furthermore, previous attempts made to seal the above mentioned central chambers hermetically so that they pressurize when they are filled with leak liquid in order to prevent further leakages, proved unsuccessful. As a matter of fact, said chambers should be equipped not only with static gaskets but also with at least one dynamic gasket for each of said chambers, with particular reference to the chamber traversed by the swinging arm of the transmitter or of the motor. However, such sealing arrangement could also result in liquid leakage to the outside.

Furthermore, the above mentioned drawbacks, i.e. oil leakage and continuous re-filling, can be responsible for the irregular performance of the windshield wiper, inasmuch as the reduced quantity of the displaced liquid, causes a reduction of the swing of the oscillatory motion of the wiper arms.

As far as noise is concerned, the performance of hydraulic windshield wipers known in the art is noiseless, and any noise is caused by mechanical connections of the motors. Furthermore it is simple to insulate the transmitter against noise production. However, noise produced by the impact of the windshield wiper at the return stroke thereof, due to the play between the wiper arm and the wiper, is not easily prevented.

An object of the present invention is to avoid the above mentioned drawbacks by providing the hydraulic units with certain new and useful improvements, in order to obtain:
- the automatic and continuous supply of the hydraulic circuit with liquid, to ensure the constant stroke of the driving pistons and hence of the wiper arms.
- the reduction, to a minimum, of the noise caused by impact of the windshield wiper arms.
- the continuous, automatic recovery of the liquid which leaks through the piston of the transmitter and the motor gaskets, with re-circulation of the liquid in said circuit.
- the quick filling of the hydraulic circuit with liquid, as well as the quick draining of air from said circuits.

According to the invention, the continuous automatic supply and recovery of the liquid is realized by means of a transmitter-motor unit, wherein the quantities displaced or caused to be displaced by the piston stroke of the transmitter, are caused to flow from one chamber into the other through at least one longitudinal passage provided in each driving piston.

According to a preferred and simple embodiment of the invention, the passage through the piston is controlled by means of two opposed valves arranged at the outer ends of said piston, to co-operate with two corresponding driving push rods mounted at the ends of the driving cylinders in such a way that — when one or the other of said valves opens upon impact with the corresponding push rod — the liquid flows from one into the other chamber of the driving cylinder.

When said valve opens, the piston is practically at the end of its stroke, except for a slight displacement at a limited speed which, according to the invention, is utilized for the slow completion of the stroke of the wiper arm in such a way that, when the return stroke starts, the noise produced by the piston is minimal. Said noise undergoes a further reduction due to an interval prior to the start of the reverse motion, said interval being required to allow the liquid to flow from the one into the other chamber through the above mentioned passage.

It is possible to provide for axial adjustment of the push rods, to obtain an adjustment i.e. individual adjustment of the driving pistons stroke and thus the swing of the oscillatory motion of the associated wiper arms. According to the invention the liquid which leaks from the central chambers of the driving pistons is collected near the toothed pinions and then conveyed first into the central chamber of the transmitter and then into the pressurized chamber of the transmitter, by means of an auxiliary hydraulic pump controlled by the piston of the transmitter.

The quick supply of liquid to the circuits is ensured by means of ducts and valves which connect each of the chambers of the transmitter and of the motors with the pressure chamber of the auxiliary pump, which is in turn connected, through valves, both with the central chamber of the transmitter and with an external source of liquid. The quick outlet of the air is ensured through exhaust valves, provided in all the chambers of the motors.

The invention will be now described with reference to the annexed drawing the sole FIGURE of which schematically illustrates by way of example, an embodiment of a hydraulic unit according to the invention consisting of one pump and two motors.

In the drawing, B designates a fluid pressure transmitter and C1, C2 two motors respectively. Transmitter B is equipped with a double-acting piston 4, provided with gaskets 5 and with guide rings 6. Piston 4 is driven by means of a crank mechanism 7. The two motors C1, C2 include double-acting pistons, 8 and 9 respectively with corresponding gaskets 10 and 11. The two pistons 8 and 9 transmit oscillating motion to the shafts A1 and A2 of windshield wiper arms R1 and R2 by means of rack and pinion couplings 12.

Each of the two pistons 8 and 9 is equipped with opposed valves 13 and 14, and 15 and 16 respectively. Each valve pin of each piston is arranged at the ends of a duct, 17 and 18 respectively, which traverses the piston from one pressurized chamber to the other, i.e. in axial direction and upward, toward the right end of each of the pistons, to facilitate the outlet of air during the filling of the hydraulic circuit. Each of the pair of valves 13–14 and 15–16 respectively, co-operate with axially adjustable end-stroke push rods 19–20 and 21–22 respectively, to cause the corresponding valves to open at the ends of the piston stroke. The two motors C1 and C2 are provided with vent cocks 23–24 and 25–26 respectively, located on top of the corresponding pressurized chambers.

A discharge cock 27 is provided midway along a duct 28 which connects motors C1 and C2 in series. Transmitter B is provided with an automatic filling and recovery device for the continuous recovery of any liquid which leaks past the gaskets of the transmitter and motors 2 and 3. This device consists of an auxiliary pump D provided with one piston 29 and with a corresponding gasket 30 slidably arranged in cylinder 32. At the upper end of pump D, a valve 33 is slidably arranged on rod 34 of piston 29 together with respective sealing gasket 35. A spring 36 acts upon valve 33 to urge the same against sealing seat 37 which separates central chamber 38 of piston 4 from pressurized chamber 39 of piston 29. Central chamber 38 is closed in the vicinity of crank mechanism 7 by means of a flexible cap 55 retained by body 1 of transmitter B. Chamber 39 is in communication with the pressurized chambers As and Ad by means of two ducts 40 and 41, said chambers being provided at the left and the right side of transmitter B respectively, through two retaining valves 42 and 43 respectively.

The outer end, or head 44 of rod 34 of piston 29, which can be provided with a roller if desired, rests against a flat seat 45 of piston 4 during the greater part of the stroke of said piston, in such a way that piston 29 is pushed toward the bottom of its respective cylinder, valve 33 is maintained open and chambers 38 and 39 are connected to each other. During the last part of the stroke of piston 4 either in one or in the other translatory direction, i.e. when valves 13, 15 or 14, 16 respectively of the two motors C1 and C2 open by means of the corresponding end stroke abutments, outer end 44 encounters, on the sliding surface of the piston, one of two recesses 46 and 47 respectively, and piston 29, which is baissed by corresponding spring 32, moves forward, to close valve 33 in cooperation with spring 36, to pressurize the liquid contained in chamber 39. Flat surface 45 and recesses 46 and 47 in piston 4 constitute a driving means for piston 29. Device D of the invention is completed by a pipe fitting 48 and a corresponding cock 49, as well as by duct 50, connecting central liquid tight chambers 51 and 52 respectively of the two motors 2 and 3 with the central liquid-tight chamber 38 of cylinder 1.

Finally, the overall apparatus is completed by two ducts 53 and 54 respectively, connecting transmitter B with motors C1 and C2, in such a way as to provide a hydraulic circuit in series connection.

In the following, consideration is being given in the first place to the filling operation of the hydraulic circuit with oil and to the venting or draining of the air contained in said circuit. Motors C1 and C2 are set to zero at the end of the power stroke, either in one or in the other direction, that is in the directions foreseen for the idling positions of wiper arms R1 and R2, for instance as shown in the drawing. Draining or vent cocks 23, 24, 25, 26 and 27 should be open and connected by means of movable pipes, of the type as delivered with the assembling equipment, such pipes being provided with pipe unions for said cocks (not shown in the drawings) for connection with the reflux liquid collecting tank during the filling operation of the unit.

Valves 14 and 16 are opened and maintained in this position by end-stroke abutments 20 and 22. Also transmitter B should be maintained, with the aid of the automatic zero setting device, inserted in the driving motor of the transmitter, in the zero position, corresponding with that of motors C1 and C2, for instance as shown in the drawing.

After connection of fitting 48 with a duct adapted to connect the unit with a supply of a suitably pressurized liquid, and after opening of cock 49, the liquid fills chamber 39. As valve 33 is closed, with piston 4 at the end of its stroke and with head 44 in cavity 47, the liquid flows after filling chamber 39, successively through ducts 40 and 41 and through valves 42 and 43, into chambers As and Ad of transmitter B.

The unit operates as follows: starting from the position of the members as shown in the drawing, piston 4 is shifted, by means of crank member 7, in the direction of arrow x to the right and the liquid moves toward motor C2 to cause the piston 9 thereof and closed valve 15 to move, together with piston 8, synchronously in the direction of arrow y. If the adjustable end-stroke abutments 19 and 21 of motors C1 and C2 are correctly adjusted, the two pistons 8 and 9 cause valves 13 and 15 to open simultaneously, after which said pistons stop, to provide direct communication between the two chambers Ad and As of pump 1, thus providing for the transfer of the liquid from the one into the other of said chambers, with pistons 8 and 9 at rest at the end of the stroke.

Therefore, motors C1 and C2 are at rest, until transmitter B achieves its delivery stroke. After said interval, the motion of piston 4 is reversed and the above described operating cycle is repeated symmetrically. Due to the feature that, in practice, end-stroke abutments 19 and 21 are not exactly phased and supposing that the above mentioned abutment 21 is the first to exert its action, valve 15 opens and piston 9 stops. In this case the liquid flows directly from the right chamber Ad of transmitter B into piston 8 of motor C1, thus causing this motor to continue and to complete its stroke, and as valve 13 is still closed, liquid flow continues until valve 13 is opened by means of abutment 19, after which piston 8 comes to a standstill.

Successively, the working operation is completed as previously described.

The above described system provides two substantial advantages:

an interval at the end of the stroke, to dampen the noise caused by the impact of the windshield wiper arms prior to the reverse motion thereof;

possible adjustment, within certain limits, of the windshield wiper strokes, either to realize two identical or two different stroke lengths, as such feature may prove advantageous in certain cases.

The stability of the windshield wiper arms at the zero point is ensured by the use of a reduction gear of the irreversible type for the pump drive. The stability of the windshield wiper arms at rest is necessary to prevent the displacement of said arms when subject to external stress, for instance during a windshield cleaning operation, in particular when the windshield wipers are conveyed through an automatic washing plant.

As a matter of fact, assuming that an action directed to the right is exerted on the windshield wiper arm $R_2$ of motor $C_2$, rotational motion of said wiper arm is impossible, as valve 15 is closed, whereas the liquid would be pushed toward the right chamber Ad of transmitter 8 which cannot accept it, as said transmitter is out of operation and the motion thereof is not reversible, due to the irreversibility of the reduction gear to which it is mechanically connected. On the other hand, when an action directed toward the right is exerted on the above mentioned wiper arm $R_2$, said arm is allowed to rotate over a slight angle which corresponds to the displacement of the piston of motor C2, until valve 16 disengages from the respective end-stroke push rod 22, after which valve 16 closes and the piston pushes liquid toward the left chamber As of transmitter B through piston 8 of motor C1, the valves of which are open; but the left chamber of transmitter B cannot receive the amount of liquid, as the piston of said transmitter cannot translate, since the motor of said transmitter is irreversible. As a consequence, any further motion of the wiper arm beyond the aforesaid angle is prevented. The displacement of the piston of motor C2, which corresponds to the slight angle of rotation of the wiper arm, to disengage valve 16 from the corresponding end-stroke abutment 22, causes the displacement of the liquid from the central section situated between motors C1 and C2, to the lateral section between motor C2 and the right chamber Ad of transmitter B, through valve 16. Therefore, when the windshield wiper arm is caused to rotate to the left, it unphases by an amount which corresponds to the above mentioned slight angle.

When transmitter B is operated, the piston of motor C2 starts translating and pushes also piston of motor C1 into translation. The piston of motor C2 reaches the abutment for the left side translatory stroke, after performance of a reduced stroke, i.e. reduced by the amount which corresponds to the initial unphasing by such slight angle of rotation which has been imposed upon the wiper arm, after which valve 15 opens and piston 9 of motor C2 stops.

However, a reduced stroke of piston 4 will correspond to the impact of piston 9 of motor C2 with the left hand end-stroke abutment 21 and therefore said piston 4, which continues performing the remaining part of its stroke, during the slight rotation imposed upon windshield wiper arm A2 of motor C2, provides a re-transfer of the amount of liquid which has been first transferred from said section to the lateral section between the motor and chamber Ad at the right side of transmitter B, to the central section between motors C1 and C2.

The above mentioned transfer is performed through valve 16 which opens, due to the liquid pressure and through valve 15 which has been opened by end-stroke abutment 21. Therefore, piston 8 of motor C1 continues to be pushed in the direction of arrow y, until the impact of said piston with the left end-stroke abutment 19 occurs and, at this point, the operating cycle connects again with the normal cycle. In other words, windshield wiper arm R2 of motor C2 reaches the end of its stroke and it waits until windshield-wiper arm R1 of motor C1 likewise reaches the end of its stroke. It is thus possible to accomplish the automatic re-phasing of the two windshield wiper arms A1 and A2 at the end of their stroke.

The foregoing discription which concerns windshield wiper arm R1 refers, as well, to windshield wiper arm R2 of motor C2. In the following consideration will be given to the recovery of such amounts of liquid as may leak through the sealing gaskets of the pistons. In the first place it should be noted that said amounts of liquid are very small, as they consist, as mentioned, of the liquid which leaks through the sliding gaskets. In consideration of the fact that, as previously mentioned, the amount of liquid delivered by each of the pressurized chambers Ad and As of cylinder 1 is substantially greater than the amount generated by the displacement of pistons 8 and 9 of motors C1 and C2 respectively, the amount of liquid which leaks through gaskets 10 and 11 of said motors is substantially smaller than the difference between the two aforementioned amounts. Leakage can occur in any of the chambers of the transmitter and of the motors and, in any case, said leakage will be responsible for a slight reduction in speed of either one or both of the driving pistons which will, however accomplish their complete stroke, since the amount of liquid delivered by transmitter B is in excess of the amount generated by the displacement of pistons 8 and 9 of said motors; it follows that, when said driving pistons are at the end of their stroke, piston 4 nevertheless continues its stroke. However, as soon as piston 4 approaches the end of its stroke, it moves one of recesses 46 or 47 toward head 44 of rod 34 of piston 29, so that said recess faces said head and valve 33 closes and piston 29 which is acted on by spring 32, provides for the pressurization of chamber 39. Therefore, the liquid flows either through one or the other of ducts 40, 41 and either through one or the other of valves 42, 43 into the corresponding lateral section, thus overcoming any loss by resupply of this quantity in the hydraulic circuit. It is obvious that the quantity of liquid which leaks through the gaskets collects in chamber 38 of transmitter B, either directly if all of said liquid or part thereof leaks through the gaskets of the piston 4, or indirectly, through chamber 51 or 52 of the motors and through collecting duct 50, if the liquid leaks, entirely or in part, through the gaskets of the pistons of the motors. As soon as piston 4 reverses its stroke, head 44 engages the slidable seat 45 of the above mentioned piston, to push piston 29 against the action of each of spring 32, after which either valve 42 or 43 closes, whereas valve 33 opens, to connect chamber 38 and chamber 39. As a consequence, the initial conditions of the circuit at the moment in which piston 4 has started its translatory stroke, are entirely recovered. If leakage occurs to the outside, for instance through the connections of the ducts or the like, all of the reserve of oil contained in chamber 39 cannot be recovered and said chamber should be re-filled at regular intervals.

I claim:

1. A hydraulic driving unit for windshield wipers comprising a transmitter including a double-acting piston with chambers at opposite ends thereof, hydraulic motor means drivingly coupled to said transmitter for driving in turn a windshield wiper, said hydraulic motor means comprising two hydraulic motors connected in series each including a cylinder with a double-acting piston therein, each piston having a passage therethrough which is inclined with respect to the axis of travel of said piston, a valve in said passage of each piston at each of the ends thereof normally closing the passage, each said cylinder of the hydraulic motors defining first and second chambers at opposite ends of the associated piston, the second chambers of the cylinders being connected together and the first chambers being connected to respective chambers of the double-acting piston of the transmitter such that the pistons of the hydraulic motors follow the movement of the piston of the transmitter, said pistons of the hydraulic motors having end of stroke positions, two push rods in the cylinder of each hydraulic motor for acting on an associated valve to open the same at the end of stroke position of the respective piston, and an auxiliary pump coupled to said piston of the transmitter to be driven thereby, said auxiliary pump being connected to said transmitter for the circulation of liquid thereto, said piston of the transmitter having a greater capacity than the pistons of the hydraulic motors and thereby displacing a greater quantity of liquid, the excess of liquid pumped by the piston of the transmitter flowing through the passages in the piston of the hydraulic motors when such pistons reach their end of stroke positions and the valves are opened by the push rods.

2. A driving unit as claimed in claim 1 wherein said push rods are secured in the cylinder of the respective hydraulic motor in facing relation with the associated valve in the passage of the respective piston, and means supporting said push rods for axial adjustment for controlling the stroke of the pistons.

3. A hydraulic driving unit for windshield wipers comprising a transmitter including a double-acting piston with chambers at opposite ends thereof, hydraulic motor means drivingly coupled to said transmitter for driving in turn a windshield wiper, said hydraulic motor means comprising at least one cylinder with a double acting piston having a passage therethrough, valve means in said passage normally closing the same, said cylinder of the hydraulic motor means defining chambers at opposite ends of the piston which are connected to the chambers of the double acting piston of the transmitter such that the piston of the hydraulic motor means follows the movement of the piston of the transmitter, said piston of the motor means having end of stroke positions, means for opening said valve means when the piston of the motor means reaches its end of stroke positions, and an auxiliary pump coupled to said piston of the transmitter to be driven thereby, said auxiliary pump being connected to said transmitter for the circulation of liquid thereto, said piston of the transmitter having a greater capacity than the capacity of the piston of the hydraulic motor means and thereby displacing a greater quantity of liquid, the excess of liquid pumped by the piston of the transmitter flowing through the passage in the piston of the hydraulic motor means when such piston reaches its end of stroke positions and the valve means is opened, said hydraulic motor means including seals on said piston at the ends thereof for sealing the chambers at the ends of the piston, said transmitter including seals on the ends of the piston thereof for sealing the chambers at the ends of said piston, first duct means connecting the cylinder of the hydraulic motor means between the seals on the piston therein and the cylinder of the transmitter between the seals on the piston therein, and second duct means connecting the auxiliary pump to the cylinder of the transmitter between the seals on the piston therein such that leakage fluid flowing past the seals on the piston in the hydraulic motor means is conveyed to the transmitter and then reintroduced by said auxiliary pump into the chambers at the ends of said transmitter.

4. A driving unit as claimed in claim 3 wherein said hydraulic motor means comprises two of said double-acting pistons in respective cylinders connected in series and constituting respective hydraulic motors, each said piston having respective passage and associated valve means.

5. A driving unit as claimed in claim 4 wherein said valve means in each piston includes one valve at each of the ends of the respective passage, said means for opening the valve means including two push rods in the cylinder of each hydraulic motor, each push rod acting on an associated valve to open the same at one end of stroke position of the respective piston.

6. A driving unit as claimed in claim 3 wherein said auxiliary pump includes a valve in said second duct means, a spring urging said valve to a closed position, a piston including a push rod urged against the piston of the transmitter, the piston of the transmitter having a cam surface for displacing said push rod and the piston thereof as said piston of the transmitter undergoes displacement, said push rod being positioned to open said valve in the second duct means against the action of said spring as the push rod is displaced by the transmitter piston.

7. A driving unit as claimed in claim 6 wherein said auxiliary pump includes a cylinder in which said piston of the auxiliary pump travels and a delivery chamber connected to the end chambers of said transmitter.

8. A driving unit as claimed in claim 7 comprising a valved connection leading to said delivery chamber of said auxiliary pump for supply of pressure liquid thereto from an external source.

9. A driving unit as claimed in claim 7 comprising outlet valves in the end chambers of the hydraulic motors at the highest elevation in said chambers.

* * * * *